(12) United States Patent
Chuo et al.

(10) Patent No.: US 8,267,585 B2
(45) Date of Patent: Sep. 18, 2012

(54) MOTION TRANSMISSION APPARATUS WITH A CHAIN

(75) Inventors: Yung-Tsai Chuo, Taichung (TW); Ming-Yao Lin, Taichung (TW); Chiung-Yao Wang, Taichung (TW); Yan-Yu Chen, Taichung (TW); Po-Chuan Hsu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 327 days.

(21) Appl. No.: 12/765,596

(22) Filed: Apr. 22, 2010

(65) Prior Publication Data

US 2011/0262061 A1  Oct. 27, 2011

(51) Int. Cl.
*F16C 29/06* (2006.01)
(52) U.S. Cl. ............................. 384/45; 384/51
(58) Field of Classification Search ............ 384/43–45, 384/51, 49; 74/424.88
See application file for complete search history.

(56) References Cited

U.S. PATENT DOCUMENTS

| 6,644,140 | B2 * | 11/2003 | Akido | 74/424.88 |
| 2002/0044703 | A1 * | 4/2002 | Itabashi | 384/45 |
| 2005/0036721 | A1 * | 2/2005 | Wu et al. | 384/51 |
| 2007/0076989 | A1 * | 4/2007 | Matsumoto et al. | 384/45 |
| 2009/0214144 | A1 * | 8/2009 | Wu et al. | 384/51 |

* cited by examiner

*Primary Examiner* — Thomas R Hannon (57) ABSTRACT

A motion transmission apparatus with a chain, wherein the chain comprises a plurality of spacers and links for connecting the spacers together, each of the spacers is provided at both sides thereof in an axial direction of an elongated shaft with a plurality of holding protrusions and inclined at an angle from a center of each of the spacers toward a peripheral edge thereof in such a manner that a distance between outer ends of two opposite holding surfaces on two neighboring spacers is smaller than a diameter of the rolling elements, the holding protrusions of the chain are annularly arranged in 120 degree intervals in such a manner that the holding protrusions on the same side of each spacer are alternatively arranged in a direction which is vertical to the links, and two of the holding protrusions are arranged in a line parallel to a direction of the links.

12 Claims, 10 Drawing Sheets

MOTION TRANSMISSION APPARATUS WITH A CHAIN

BACKGROUND OF THE INVENTION

1. Field of the Invention

The present invention relates to a chain for rolling elements, and more particularly to a chain for holding the rolling elements of a motion transmission apparatus.

2. Description of the Prior Art

Figure 9A:
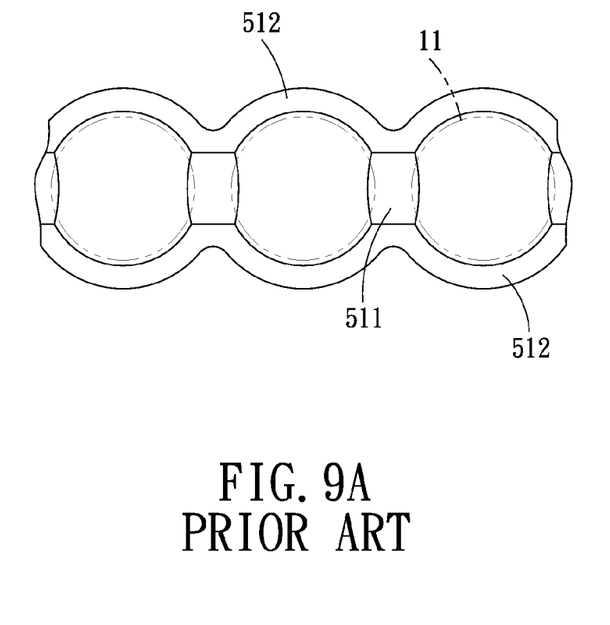
FIG. 9A is a top view of a conventional chain for a linear transmission apparatus.
Figure 9B:
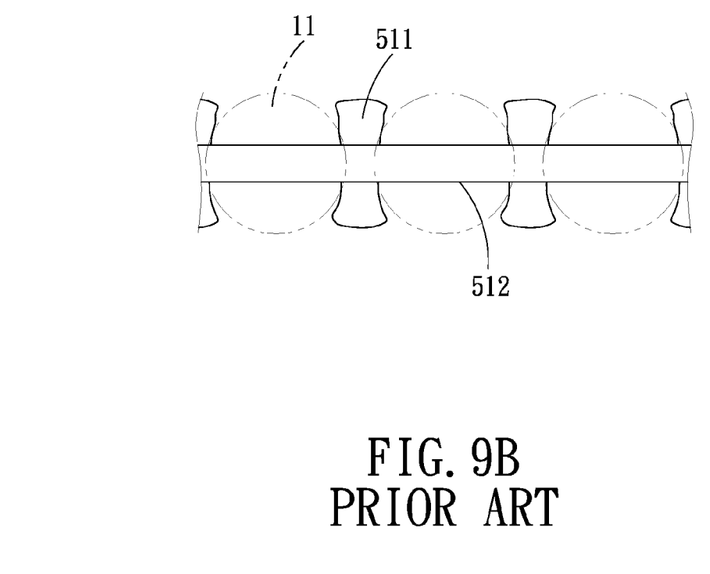
FIG. 9B is a side view of the conventional chain for a linear transmission apparatus.

Referring to FIGS. 9A and 9B, a conventional chain structure for a motion transmission apparatus comprises includes a plurality of spacers 511 and two links 512 at both sides of the respective spacers 511 for connecting them together so that a plurality of rolling elements 11 roll within the spaces defined by the spacers 511 and the links 512. If this conventional chain structure is an assembly structure, it will cost a lot of time and manpower to assemble spacers 511 and the links 512 together into a chain structure. If the spacers 511 are unitary with the links 512, the spacers 511 are concave structures from the point of view of mold design, which will lead to the occurrence of undercut during demolding. Forced demolding has a size restriction and might cause deformation of the product to be formed.

Figure 10:
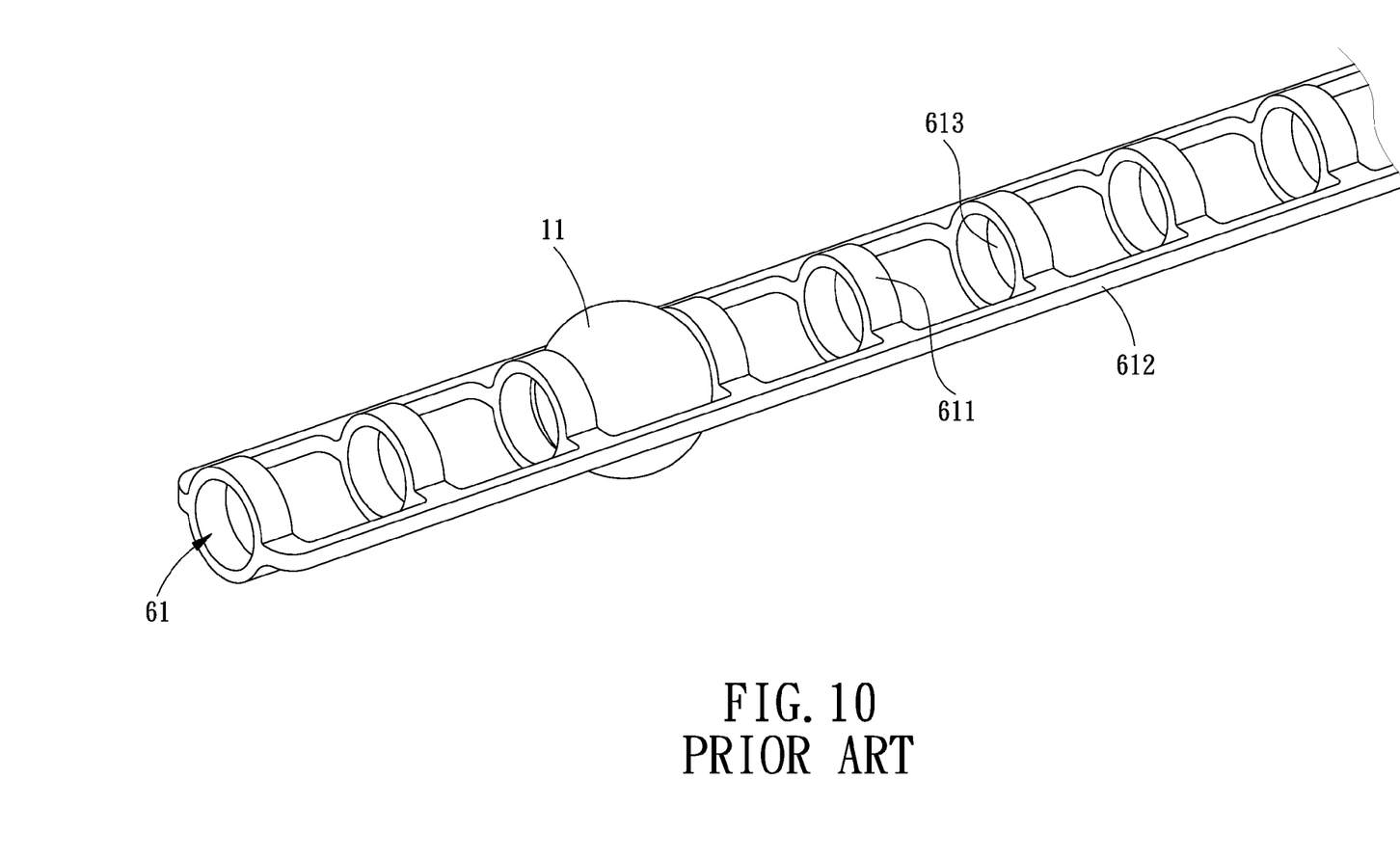
FIG. 10 is a perspective view of another conventional chain for a linear transmission apparatus.

Referring then to FIG. 10, another conventional chain structure 61 for holding the rolling element 11 comprises a plurality of spacers 611 and two links 612 connected at both sides of the spacers 611. The disadvantage of this conventional chain structure is that, during injection molding, a thin and long cylindrical member must be used as a core in order to form the circular aperture 613 in the respective spacers 611, and after forming of the product, it has to use a complicated transmission mechanism to push or pull out the cylindrical member. However, the formed product will tightly embrace the cylindrical member after cooling off, making it difficult to pull out the cylindrical member. Meanwhile, the pulling action might cause deformation of the formed product, and the cylindrical member is likely to deform after being repeatedly pulled out and pushed back. Furthermore, during injection molding, the injection pressure is so great that the thin and long cylindrical member is very much likely to deform or break. Hence, this chain structure 61 as shown in FIG. 10 is not suitable for mass production, and the mold design and manufacturing cost is high.

The present invention has arisen to mitigate and/or obviate the afore-described disadvantages.

SUMMARY OF THE INVENTION

The primary object of the present invention is to provide a chain which is made by injection molding and suitable for mass production, and the mold design and manufacturing cost is reduced.

To achieve the above object, a chain for a linear motion transmission apparatus in accordance with the present invention comprises a plurality of spacers and two links for connecting the spacers together. The two links are located at both sides of the respective spacers in an axial direction of an elongated shaft of the linear motion transmission apparatus, each two neighboring spacers define a holding space with respect to the links for holding the rolling elements, each of the spacers is provided at both end surfaces thereof in the axial direction of the elongated shaft with a plurality of holding protrusions which are each provided with a holding surface for holding the rolling elements, each of the holding surfaces is inclined at an angle from a center of each of the spacers toward a peripheral edge thereof in such a manner that a distance between outer ends of two opposite holding surfaces on two neighboring spacers is smaller than a diameter of the rolling elements, while a distance between inner ends of the two opposite holding surfaces on two neighboring spacers is larger than the distance between the outer ends of two opposite holding surfaces on the two neighboring spacers.

The holding surface is inclined at an angle of 30-60 degrees.

The holding surface is inclined at an angle of 45 degrees.

The normal direction of the holding surface is toward a center of each of the rolling elements.

The outer surfaces of two holding protrusions on two sides of a same spacer are cut into a flat surface which is flush with the peripheral edge of the spacer.

The holding protrusions of the chain are annularly arranged in 120 degree intervals in such a manner that the holding protrusions on the same side of each spacer are alternatively arranged in a direction which is vertical to the links, and two of the holding protrusions are arranged in a line parallel to a direction of the links.

To achieve the above object, a linear motion transmission apparatus with a chain in accordance with the present invention comprises: an elongated shaft, a slide block, two circulating members and a rolling assembly. The elongated shaft is defined with a linear rolling groove. The slide block is movably mounted on the elongated shaft and formed with a rolling groove for cooperating with the rolling groove of the elongated shaft to form a load path, the slide block is further axially formed with circulating holes penetrating to both end surfaces thereof. The two circulating members are fixed at both ends of the slide block and each defined with a return path which is connected to the load path, and the circulating holes to form an endless circulation path. The rolling assembly is disposed in the circulation path and includes a chain and a plurality of rolling elements, the chain comprises a plurality of spacers and two links for connecting the spacers together, the two links are located at both sides of the respective spacers, each two neighboring spacers defines a holding space with respect to the links for holding the rolling elements, each of the spacers is provided at both sides thereof in the axial direction of the elongated shaft with a plurality of holding protrusions which are each provided with a holding surface for holding the rolling elements, each of the holding surfaces is inclined at an angle from a center of each of the spacers toward a peripheral edge thereof in such a manner that a distance between outer ends of two opposite holding surfaces on two neighboring spacers is smaller than a diameter of the rolling elements, while a distance between inner ends of the two opposite holding surfaces on two neighboring spacers is larger than the distance between the outer ends of two opposite holding surfaces on the two neighboring spacers.

The holding surface is inclined at an angle of 30-60 degrees.

The holding surface is inclined at an angle of 45 degrees.

The normal direction of the holding surface is toward a center of each of the rolling elements.

The outer surfaces of two holding protrusions on two sides of a same spacer are cut into a flat surface which is flush with the peripheral edge of the spacer.

The holding protrusions of the chain are annularly arranged in 120 degree intervals in such a manner that the holding protrusions on the same side of each spacer are alternatively arranged in a direction which is vertical to the links, and two of the holding protrusions are arranged in a line parallel to a direction of the links.

To achieve the above object, a linear motion transmission apparatus with a chain in accordance with the present invention comprises: an elongated shaft, a slide block, a circulating member and a rolling assembly. The elongated shaft is defined with a linear rolling groove. The slide block is movably mounted on the elongated shaft and formed with a rolling groove for cooperating with the rolling groove of the elongated shaft to form a load path. The circulating member is fixed to the slide block and defined with a return path which is connected to the load path to form an endless circulation path. The rolling assembly is disposed in the circulation path and includes a chain and a plurality of rolling elements, the chain comprises a plurality of spacers and two links for connecting the spacers together, the two links are located at both sides of the respective spacers in the axial direction of the elongated shaft, each two neighboring spacers define a holding space with respect to the links for holding the rolling elements, each of the spacers is provided at both sides thereof in the axial direction of the elongated shaft with a plurality of holding protrusions which are each provided with a holding surface for holding the rolling elements, each of the holding surfaces being inclined at an angle from a center of each of the spacers toward a peripheral edge thereof in such a manner that a distance between outer ends of two opposite holding surfaces on two neighboring spacers is smaller than a diameter of the rolling elements, while a distance between inner ends of the two opposite holding surfaces on two neighboring spacers is larger than the distance between the outer ends of two opposite holding surfaces on the two neighboring spacers.

The holding surface is inclined at an angle of 30-60 degrees.

The holding surface is inclined at an angle of 45 degrees.

The normal direction of the holding surface is toward a center of each of the rolling elements.

The outer surfaces of two holding protrusions on two sides of a same spacer are cut into a flat surface which is flush with the peripheral edge of the spacer.

The holding protrusions of the chain are annularly arranged in 120 degree intervals in such a manner that the holding protrusions on the same side of each spacer are alternatively arranged in a direction which is vertical to the links, and two of the holding protrusions are arranged in a line parallel to a direction of the links.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 1-6, a linear motion transmission apparatus with a chain in accordance with a preferred embodiment of the present invention comprises: an elongated shaft 1, a slide block 2, two circulating members 3 and a rolling assembly 4.

Figure 1:
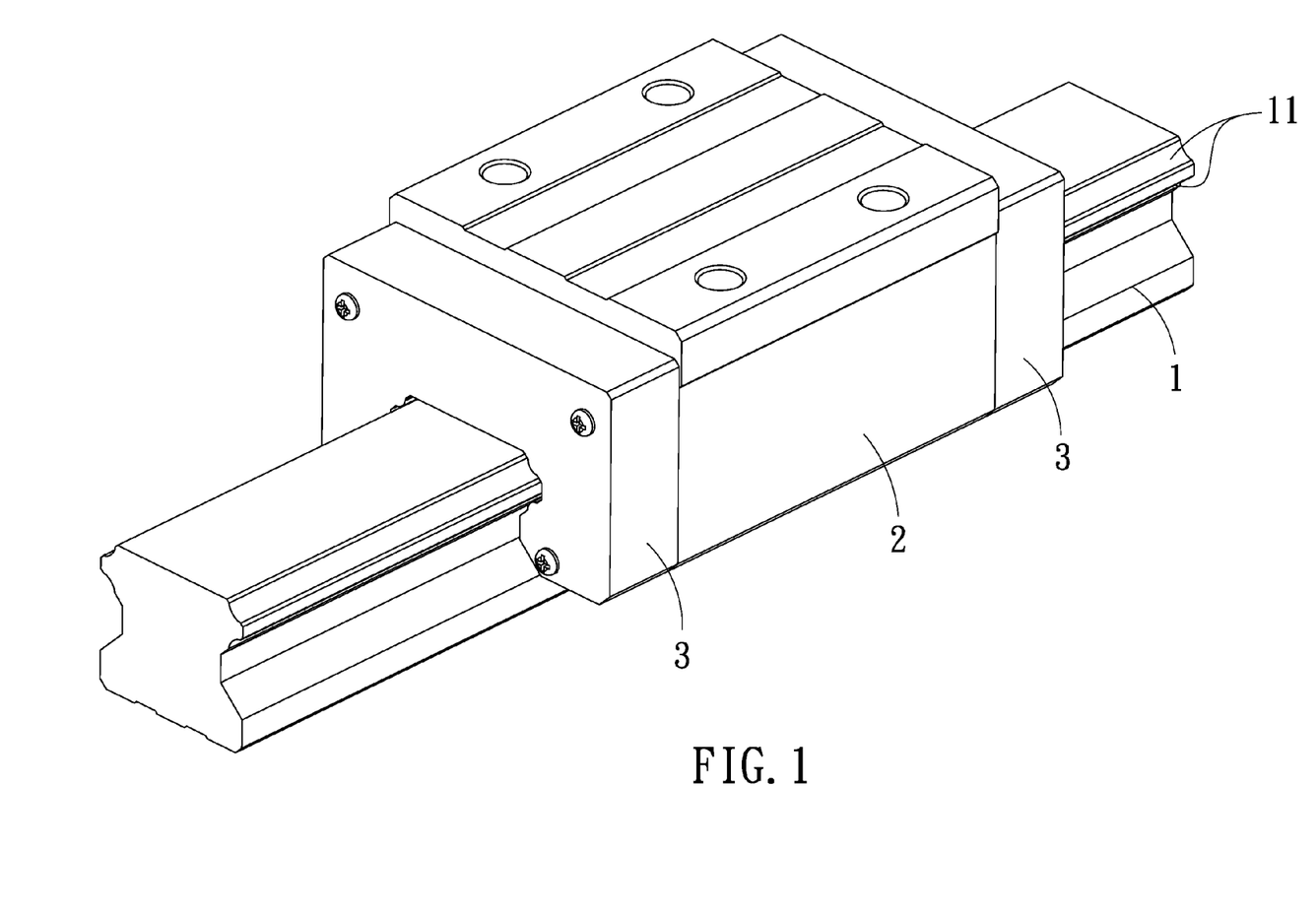
FIG. 1 is a perspective view of a linear transmission apparatus with a chain in accordance with a preferred embodiment of the present invention.
Figure 2:
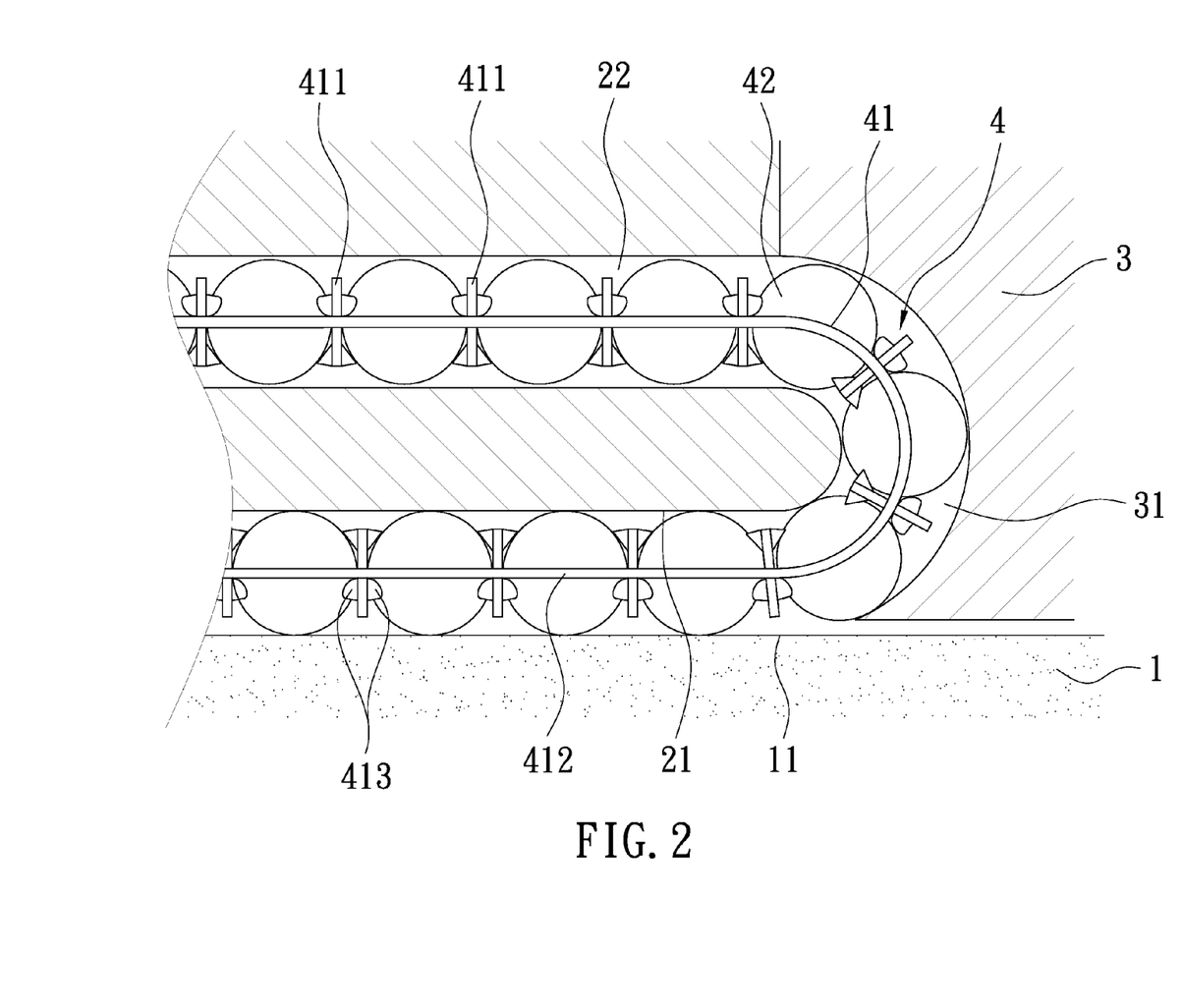
FIG. 2 is an illustrative view of the linear transmission apparatus with the present invention, showing that the rolling assembling is rolling within the circulation path.

The elongated shaft 1 is defined with a linear rolling groove 11 (which can also be a helical rolling groove).

The slide block 2 is movably mounted on the elongated shaft 1 and formed with a rolling groove 21 for cooperating with the rolling groove 11 of the elongated shaft 1 to form a load path. The slide block 2 is further axially formed with circulating holes 22 penetrating to both end surfaces thereof.

Two circulating members 3 are fixed at both ends of the slide block 2 and each defined with a return path 31 which is connected to the load path, and the circulating holes 22 to form an endless circulation path.

Figure 3:
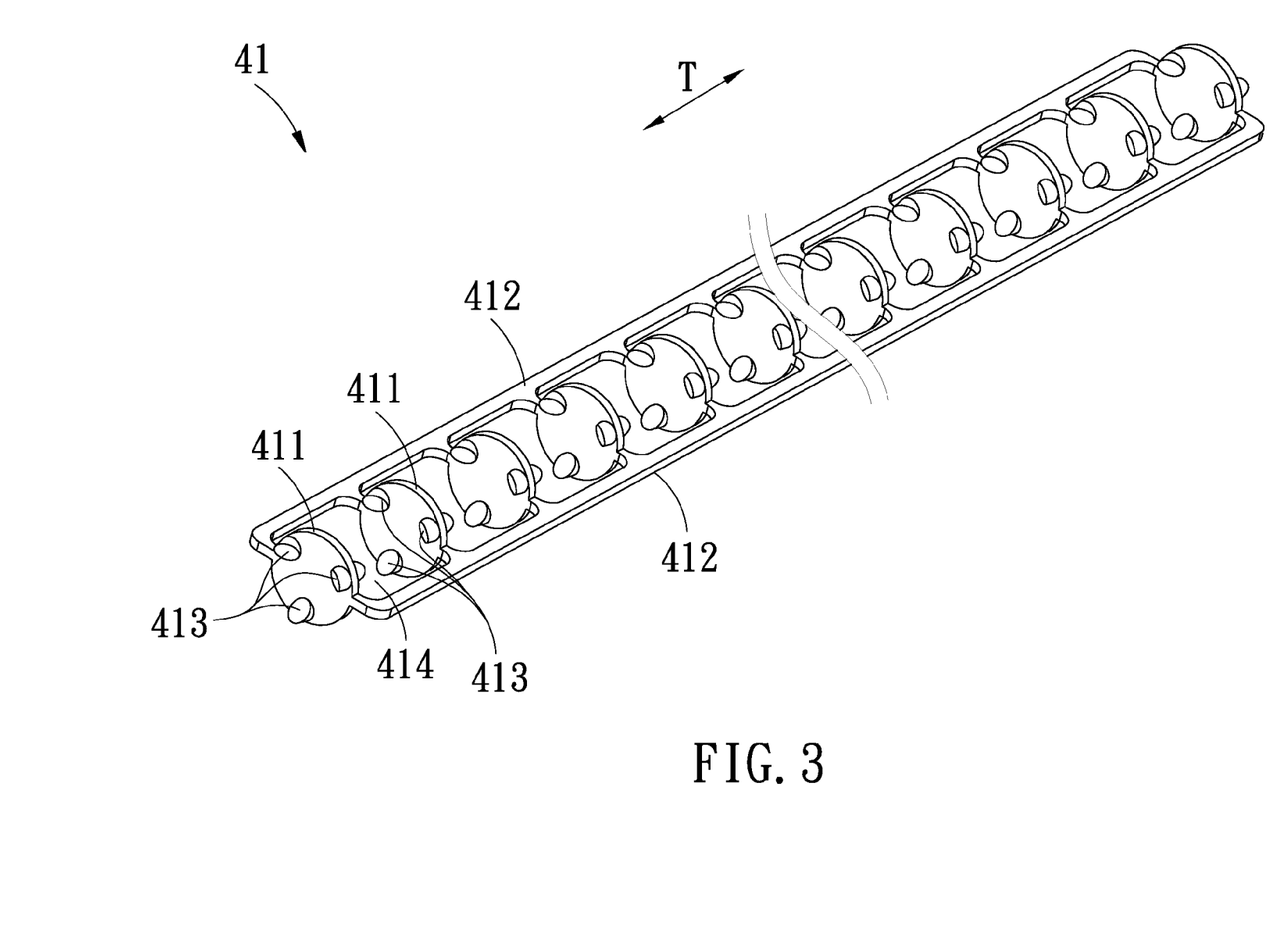
FIG. 3 is a perspective view of the chain for the linear transmission apparatus in accordance with the present invention.
Figure 4:
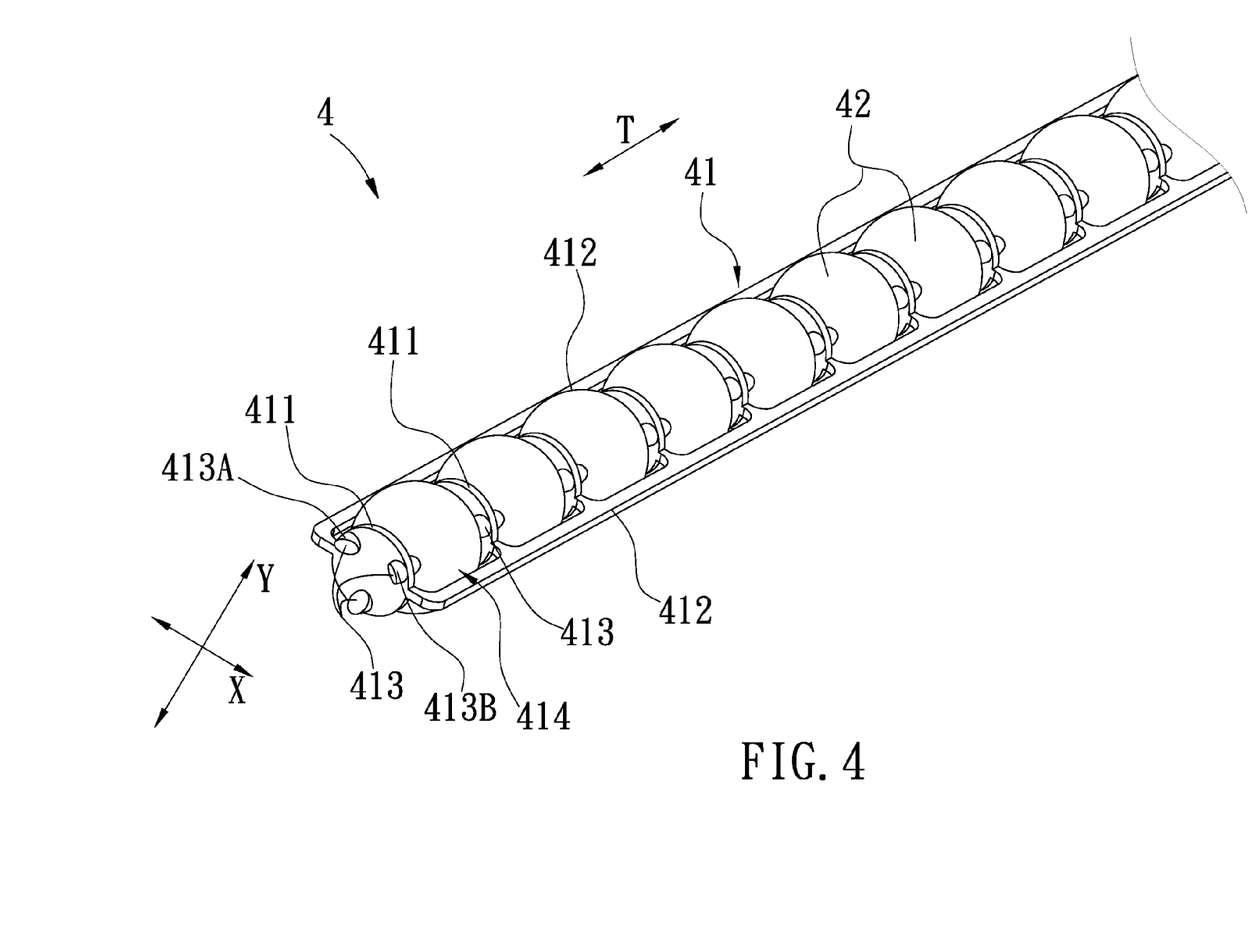
FIG. 4 is a perspective view of the rolling assembly for the linear transmission apparatus in accordance with the present invention.

The rolling assembly 4 is disposed in the circulation path and includes a chain 41 and a plurality of rolling elements 42. The chain 41 comprises a plurality of spacers 411 and two links 412 at both sides (in the axial direction T of the elongated shaft 1 as indicated by the arrow) of the respective spacers 411 for connecting them together. Each two neighboring spacers 411 define a holding space 414 with respect to the links 412 for holding the rolling elements 42. Each of the spacers 411 is provided at both end surfaces thereof in the axial direction T of the elongated shaft 1 with a plurality of holding protrusions 413 which are each provided with a holding surface 4131 for holding the rolling elements 42. The holding protrusions 413 are located within an outer periphery of the respective spacers 411.

Figure 5:
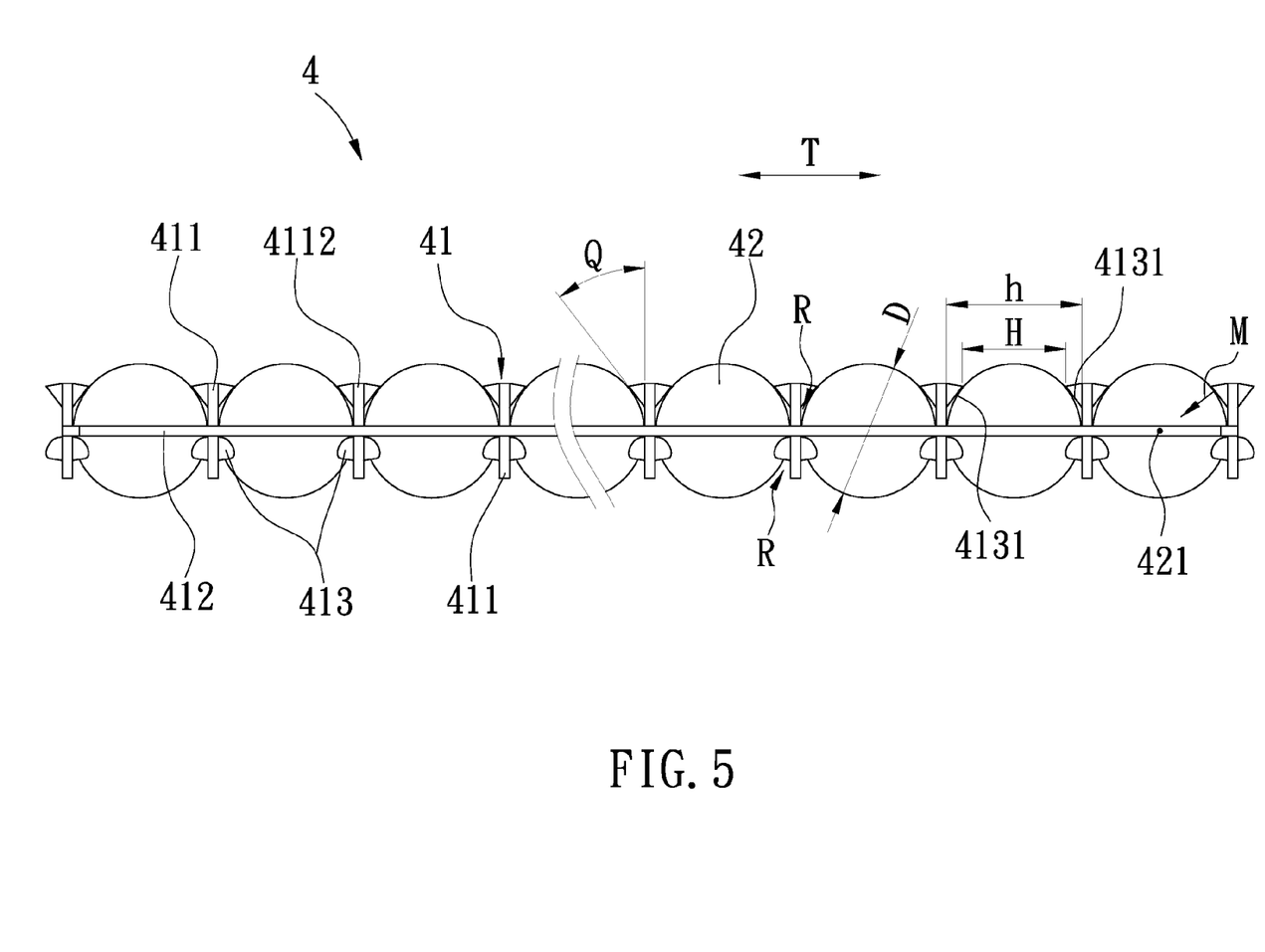
FIG. 5 is a side view of the rolling assembly for the linear transmission apparatus in accordance with the present invention.
Figure 6:
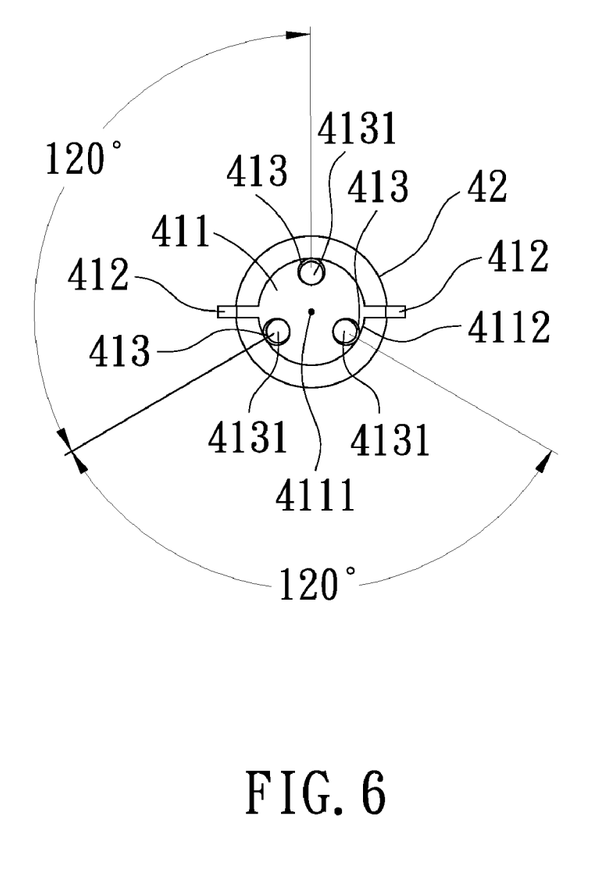
FIG. 6 is a cross sectional view of the chain for the linear transmission apparatus in accordance with the present invention.

Each of the holding surfaces 4131 is inclined at an angle Q from a center 4111 of the spacer 411 toward the peripheral edge 4112 thereof in such a manner that the distance H between the outer ends of two opposite holding surfaces 4131 on two neighboring spacers 411 is smaller than the diameter D of the rolling elements 42, while the distance h between the inner ends of two opposite holding surfaces 4131 on two neighboring spacers 411 is larger than the distance H between the outer ends of two opposite holding surfaces 4131 on two neighboring spacers 411.

Referring then to FIGS. 4-6, in order to reduce the mold design and manufacturing cost, the holding protrusions 413 of the chain 41 are annularly arranged in 120 degree intervals in such a manner that two of the holding protrusions 413 on the same side of each spacer 411 are symmetrically arranged in the direction Y which is vertical to the links 412, and two holding protrusions 413A and 413B are arranged in a line parallel to the direction X of the links 412. Forming such a chain 41 only requires the use of an upper and a lower molds, and the chain 41 can be easily made by releasing the upper and lower molds from each other without having to pull out a cylindrical member to form an aperture in the spacers. Hence, the manpower and manufacturing costs are reduced. Furthermore, the rolling elements 42 are received in the holding spaces 414, and the holding surfaces 4131 hold and prevent the rolling elements 42 from falling out of the holding spaces 414, making it easier to put the whole rolling assembly into the circulation path. Software simulation shows that when the inclined angle Q of the holding surface 4131 is 30-60 degrees, the holding surface 4131 can achieve a good holding of the rolling elements 42. When the angle Q is 45 degrees, the holding surface 4131 can achieve the best holding of the rolling elements 42, and the normal direction M of the holding surface 4131 is toward the center 421 of the rolling elements 42. When the inclined angle Q of the holding surface 4131 is 45 degrees, it has the following advantages:

First, the holding surfaces 4131 in the same holding space 414 define a rectangular space which provides a better function of holding the rolling elements 42.

Second, the holding surfaces 4131 are easy to demold, and relatively it is easy to get a relatively smooth holding surface 4131 after demolding.

Besides, after each of the rolling elements 42 is retained in the holding space 414, a plurality of clearances R will be left between the rolling element 42 and the spacers 411 for accommodation of lubrication, so that the rolling elements 42 can be lubricated efficiently, and thus the life of the linear transmission apparatus is prolonged.

Figure 7:
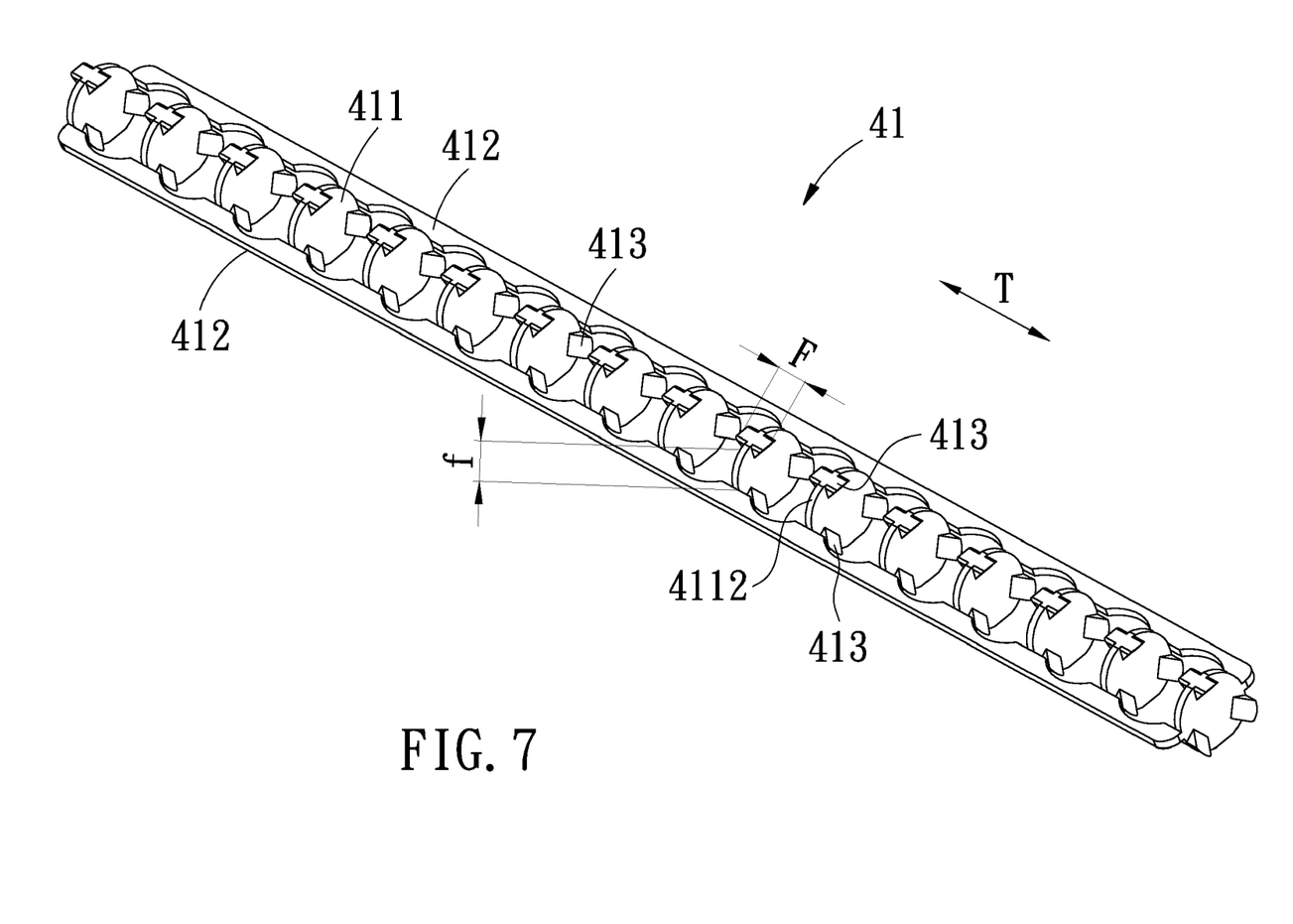
FIG. 7 is a perspective view of the chain for the linear transmission apparatus in accordance with another embodiment of the present invention.
Figure 8A:
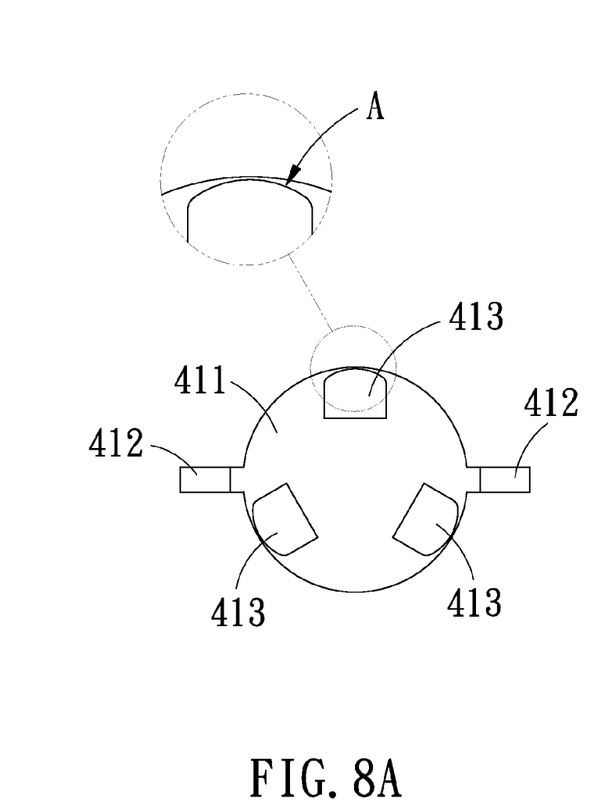
FIG. 8A is a cross sectional view of the chain for the linear transmission apparatus in accordance with the present invention (there is a height difference A between the holding protrusions 413 and the peripheral edge 4112 of the spacers 411)
Figure 8B:
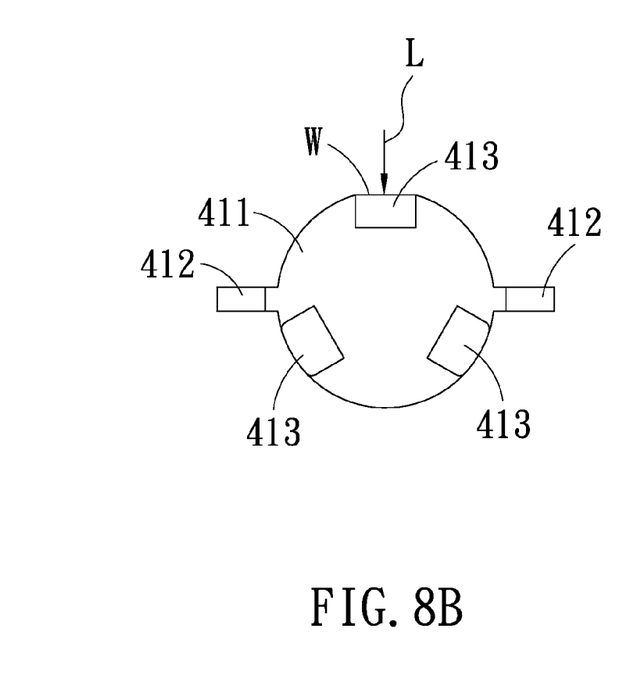
FIG. 8B is a cross sectional view of the chain for the linear transmission apparatus in accordance with the present invention (there is no height difference between the holding protrusions 413 and the peripheral edge 4112 of the spacers 411)

Referring then to FIGS. 7, 8A and 8B, the injection gate of the molds should be designed at an appropriate position (if the injection gate is located at an inappropriate position, the possibility of undercut, deformation and void increases, hence, the location of the injection gate is very importance, and it is normally located at the center of the product to be formed or at where a relatively large mold cavity is located), in order to make it easier for a small sized chain to be injection molded. The relatively large mold cavities of the chain 41 are located at the junctions between the spacers 411 and the holding protrusions 413 (as shown in FIG. 7), the axial thickness f of the respective spacers 411 is smaller than the distance F between the outer ends of two opposite holding surfaces 4131 of two holding protrusions 413 on two sides of the same spacer 411. Therefore, the mold gate L is optimally located at the junctions between the spacers 411 and the holding protrusions 413. Since the distance F between the outer ends of two opposite holding surfaces 4131 of two holding protrusions 413 on two sides of the same spacer 411 includes the axial thickness f of the two spacers 411, it is optimally that the mold gate L is located there, making it easier for the chain 41 to demold, and the time for deburring the mold gate L is considerably reduced.

Furthermore, to facilitate the forming of the junctions between the spacers 411 and the holding protrusions 413, the outer surfaces of the two holding protrusions 413 on two sides of the same spacer 411 are cut into a flat surface W which is flush with the peripheral edge 4112 of the spacers 411, as shown in FIG. 8B, so that there is no height difference between the holding protrusions 413 and the peripheral edge 4112 of the spacers 411. Otherwise, as shown in FIG. 8A, there will be a height difference A between the holding protrusions 413 and the peripheral edge 4112 of the spacers 411, which makes it difficult for the chain 41 to be formed. Hence, the present invention solves the problems of the conventional chain, making it easier for the chain to be formed, and the outer surface of the formed chain is smooth, which reduces the interference of the chain with the circulation path.

While we have shown and described various embodiments in accordance with the present invention, it is clear to those skilled in the art that further embodiments may be made without departing from the scope of the present invention.

What is claimed is:

1. A chain for a linear motion transmission apparatus, comprising a plurality of spacers and two links for connecting the spacers together; wherein:
   the two links are located at both sides of the respective spacers in an axial direction of an elongated shaft of the linear motion transmission apparatus, each two neighboring spacers define a holding space with respect to the links for holding the rolling elements, each of the spacers is provided at both end surfaces thereof in the axial direction of the elongated shaft of the linear motion transmission apparatus with a plurality of holding protrusions which are each provided with a holding surface for holding the rolling elements, each of the holding surfaces is inclined at an angle from a center of each of the spacers toward a peripheral edge thereof in such a manner that a distance between outer ends of two opposite holding surfaces on two neighboring spacers is smaller than a diameter of the rolling elements, while a distance between inner ends of the two opposite holding surfaces on two neighboring spacers is larger than the distance between the outer ends of two opposite holding surfaces on the two neighboring spacers;
   the holding protrusions of the chain are annularly arranged in 120 degree intervals in such a manner that the holding protrusions on the same side of each spacer are alternatively arranged in a direction which is vertical to the links, and two of the holding protrusions are arranged in a line parallel to a direction of the links.

2. The chain for a linear motion transmission apparatus as claimed in claim 1, wherein the holding surface is inclined at an angle of 30-60 degrees.

3. The chain for a linear motion transmission apparatus as claimed in claim 2, wherein the holding surface is inclined at an angle of 45 degrees.

4. The chain for a linear motion transmission apparatus as claimed in claim 3, wherein a normal direction of the holding surface is toward a center of each of the rolling elements.

5. The chain for a linear motion transmission apparatus as claimed in claim 1, wherein the holding protrusions are located within an outer periphery of the respective spacers.

6. The chain for a linear motion transmission apparatus as claimed in claim 1, wherein the outer surfaces of two holding protrusions on two sides of a same spacer are cut into a flat surface which is flush with the peripheral edge of the spacer.

7. A linear motion transmission apparatus with a chain, comprising:
   an elongated shaft defined with a linear rolling groove;
   a slide block movably mounted on the elongated shaft and formed with a rolling groove for cooperating with the rolling groove of the elongated shaft to form a load path, the slide block being further axially formed with circulating holes penetrating to both end surfaces thereof;
   two circulating members fixed at both ends of the slide block and each defined with a return path which is connected to the load path, and the circulating holes to form an endless circulation path;
   a rolling assembly disposed in the circulation path and including a chain and a plurality of rolling elements, the chain comprising a plurality of spacers and two links for connecting the spacers together, the two links being located at both sides of the respective spacers in an axial direction of the elongated shaft, each two neighboring spacers defining a holding space with respect to the links for holding the rolling elements, each of the spacers being provided at both end surfaces thereof in the axial direction of the elongated shaft with a plurality of holding protrusions which are each provided with a holding surface for holding the rolling elements, each of the holding surfaces being inclined at an angle from a center of each of the spacers toward a peripheral edge thereof in such a manner that a distance between outer ends of two opposite holding surfaces on two neighboring spacers is smaller than a diameter of the rolling elements, while a distance between inner ends of the two opposite holding surfaces on two neighboring spacers is larger than the distance between the outer ends of two opposite holding surfaces on the two neighboring spacers;

the holding protrusions of the chain are annularly arranged in 120 degree intervals in such a manner that the holding protrusions on the same side of each spacer are alternatively arranged in a direction which is vertical to the links, and two of the holding protrusions are arranged in a line parallel to a direction of the links.

8. The linear motion transmission apparatus with a chain as claimed in claim 7, wherein a normal direction of the holding surface is toward a center of each of the rolling elements.

9. The chain for a linear motion transmission apparatus as claimed in claim 7, wherein the outer surfaces of two holding protrusions on two sides of a same spacer are cut into a flat surface which is flush with the peripheral edge of the spacer.

10. A linear motion transmission apparatus with a chain, comprising:

an elongated shaft defined with a linear rolling groove;

a slide block movably mounted on the elongated shaft and formed with a rolling groove for cooperating with the rolling groove of the elongated shaft to form a load path;

a circulating member fixed to the slide block and defined with a return path which is connected to the load path to form an endless circulation path;

a rolling assembly disposed in the circulation path and including a chain and a plurality of rolling elements, the chain comprising a plurality of spacers and two links for connecting the spacers together, the two links being located at both sides of the respective spacers in an axial direction of the elongated shaft, each two neighboring spacers defining a holding space with respect to the links for holding the rolling elements, each of the spacers being provided at both end surfaces thereof in the axial direction of the elongated shaft with a plurality of holding protrusions which are each provided with a holding surface for holding the rolling elements, each of the holding surfaces being inclined at an angle from a center of each of the spacers toward a peripheral edge thereof in such a manner that a distance between outer ends of two opposite holding surfaces on two neighboring spacers is smaller than a diameter of the rolling elements, while a distance between inner ends of the two opposite holding surfaces on two neighboring spacers is larger than the distance between the outer ends of two opposite holding surfaces on the two neighboring spacers;

the holding protrusions of the chain are annularly arranged in 120 degree intervals in such a manner that the holding protrusions on the same side of each spacer are alternatively arranged in a direction which is vertical to the links, and two of the holding protrusions are arranged in a line parallel to a direction of the links.

11. The linear motion transmission apparatus with a chain as claimed in claim 10, wherein a normal direction of the holding surface is toward a center of each of the rolling elements.

12. The chain for a linear motion transmission apparatus as claimed in claim 10, wherein the outer surfaces of two holding protrusions on two sides of a same spacer are cut into a flat surface which is flush with the peripheral edge of the spacer.

* * * * *